(12) United States Patent
Tominaga

(10) Patent No.: US 7,886,708 B2
(45) Date of Patent: Feb. 15, 2011

(54) INTAKE AIR CONTROL APPARATUS AND METHOD

(75) Inventor: Kensuke Tominaga, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 451 days.

(21) Appl. No.: 10/572,490

(22) PCT Filed: Dec. 1, 2005

(86) PCT No.: PCT/IB2005/054009

§ 371 (c)(1),
(2), (4) Date: Jul. 17, 2008

(87) PCT Pub. No.: WO2006/059305

PCT Pub. Date: Jun. 8, 2006

(65) Prior Publication Data

US 2008/0271696 A1    Nov. 6, 2008

(30) Foreign Application Priority Data

Dec. 3, 2004   (JP) ............................. 2004-351625

(51) Int. Cl.
*F02M 35/10* (2006.01)
*F02B 17/00* (2006.01)
(52) U.S. Cl. ............. 123/184.56; 123/295; 123/184.52; 123/184.37; 123/184.27
(58) Field of Classification Search ............ 123/184.53, 123/184.21, 184.27, 184.37, 184.42, 184.47, 123/184.52, 184.56, 295, 301
See application file for complete search history.

(56) References Cited

U.S. PATENT DOCUMENTS 5,572,965 A * 11/1996 Ohsuga et al. ......... 123/184.42
5,671,708 A *  9/1997 Ichinose et al. ........ 123/184.54
6,827,060 B2 * 12/2004 Huh ........................... 123/336

(Continued)

FOREIGN PATENT DOCUMENTS

DE           10245111          8/2004

(Continued)

OTHER PUBLICATIONS

An English translation of the Japanese Office Action of corresponding Japanese Application No. 2004-351625, dated Feb. 9, 2010.

(Continued)

*Primary Examiner*—Stephen K Cronin
*Assistant Examiner*—Sizo B Vilakazi
(74) *Attorney, Agent, or Firm*—Global IP Counselors, LLP

(57) ABSTRACT

An intake air control apparatus comprises an intake air path connected to a combustion chamber, and an intake airflow control device having a first opening deviated in one direction when viewed from an axial direction of the intake air path by partially closing a cross-section of a flow path of the intake air path, and that controls distribution of an intake airflow by deviating the intake airflow downstream of the first opening to a side in which the first opening is formed, the intake airflow control device having a second opening of smaller opening area than that of the first opening, and deviated in an opposite side to the side in which the first opening is formed and at a location away from an intake air path wall.

21 Claims, 6 Drawing Sheets

U.S. PATENT DOCUMENTS

| | | | |
|---|---|---|---|
| 7,255,197 B2 * | 8/2007 | Horiko | 181/250 |
| 2001/0023677 A1 * | 9/2001 | Fujieda et al. | 123/295 |
| 2004/0060539 A1 * | 4/2004 | Fujieda et al. | 123/295 |
| 2004/0107934 A1 * | 6/2004 | Bucknell et al. | 123/184.53 |
| 2005/0155570 A1 * | 7/2005 | Confer et al. | 123/306 |
| 2006/0102142 A1 * | 5/2006 | Holder et al. | 123/308 |
| 2010/0147261 A1 * | 6/2010 | Yamaguchi et al. | 123/295 |

FOREIGN PATENT DOCUMENTS

| | | |
|---|---|---|
| GB | 930741 | 10/1963 |
| JP | 60212665 | 10/1985 |
| JP | 61061918 | 8/1986 |
| JP | 05086872 | 8/1993 |
| JP | 2000-179417 A | 6/2000 |
| JP | 2002-202033 A | 7/2002 |
| JP | 2003-293775 A | 10/2003 |

OTHER PUBLICATIONS

English Abstract for JP-05086872.
English Abstract for JP-60161918.
English Abstract for JP60212665.
WO 2004/031555 provided as English Equivalent to DE-10245111.
International Search Report.

* cited by examiner

INTAKE AIR CONTROL APPARATUS AND METHOD

RELATED APPLICATION

The disclosure of Laid Open Japanese Patent No. 2004-351625, filed on Dec. 3, 2004, including the specification, drawings and claims, is incorporated herein by reference in its entirety.

FIELD

Described herein is an intake air apparatus and method for use in an internal combustion engine, and in particular, an intake air apparatus and method for generating flow of the intake air introduced into a cylinder of an internal combustion engine.

BACKGROUND

Conventional intake air devices generate a gas flow such as swirling or tumbling of the intake air introduced into a combustion chamber of an internal combustion engine by providing an intake airflow control valve in the intake air path and controlling the opening and closing of the valve.

As disclosed in Laid Open Japanese Patent No. 2003-239749, a conventional intake air device introduces into a combustion chamber an intake airflow deviated in the upper side of the intake air path by using an intake airflow control valve having an opening with an opening area on the top. In this device, turbulent airflow can be generated in the combustion chamber by the intake airflow that passes through the main opening.

SUMMARY OF THE INVENTION

The present apparatus and method secure the generation of strong gas flow. Specifically, the present intake air control apparatus comprises an intake air path selectively connectable to a combustion chamber, and an intake airflow control device having a first opening deviated in one direction when viewed from an axial direction of the intake air path by partially closing a cross-section of a flow path of the intake air path, and controls distribution of intake airflow by deviating the intake airflow downstream of the first opening to a side in which the first opening is formed, the intake airflow control device having a second opening of smaller opening area than that of the first opening, which is deviated in an opposite side to the side in which the first opening is formed, and at a location away from an intake air path wall.

In the present apparatus and method the intake airflow that passes through the second opening prevents the intake airflow, which is deviated by passing through the first opening, from expanding towards the side that is opposite to the deviated side and prevents the gas flow from weakening, and therefore strong gas flow can be generated even if the opening area of the first opening is large in order to secure the required amount of intake air.

BRIEF DESCRIPTION OF THE DRAWINGS

For a more complete understanding of the present apparatus and method, and the advantages thereof, reference is now made to the following description taken in conjunction with the accompanying drawings, in which.

DETAILED DESCRIPTION OF THE ILLUSTRATED EMBODIMENTS

Figure 1:
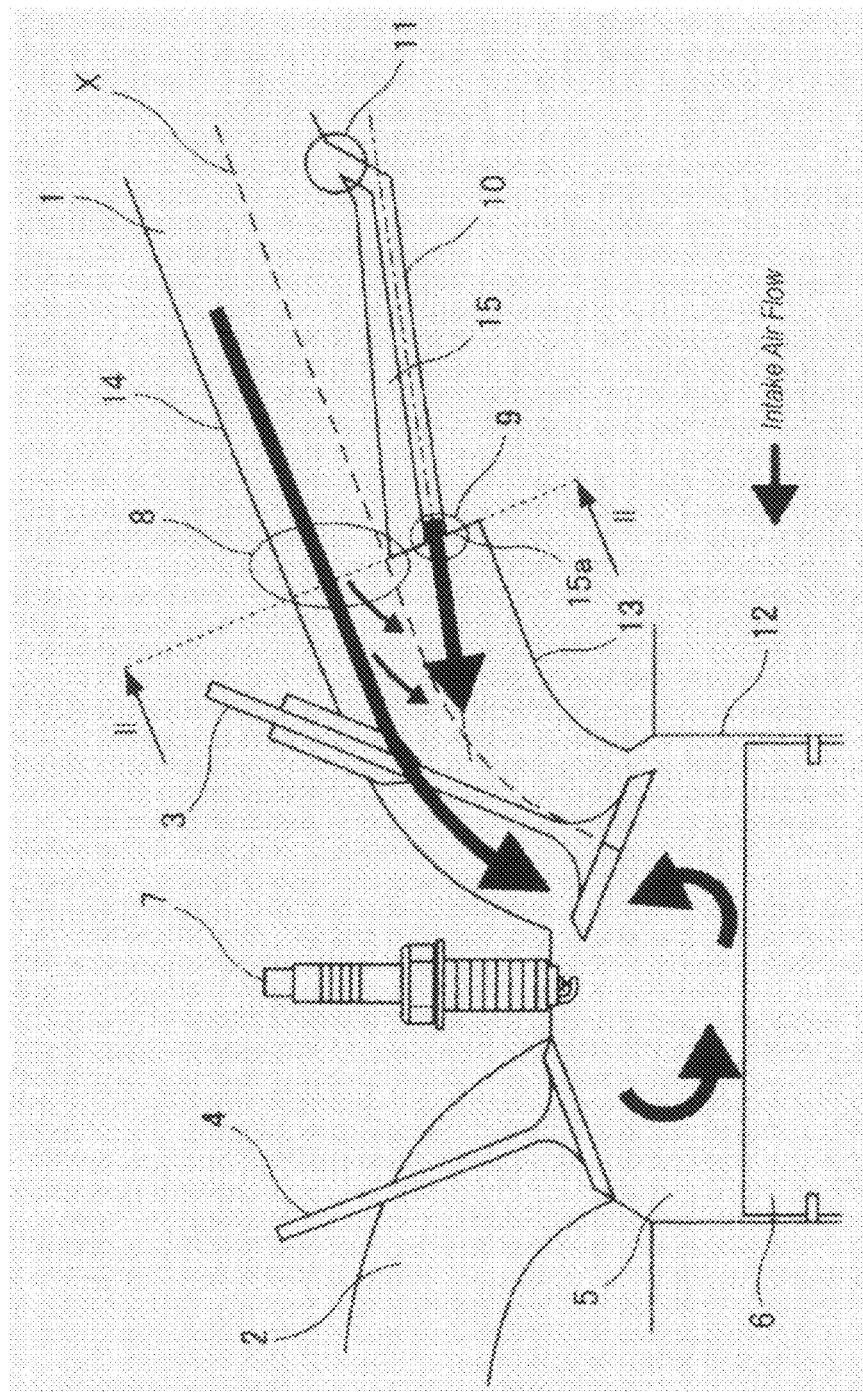
FIG. 1 is a schematic view of a system of the present apparatus according to a first embodiment thereof.

The following description refers to embodiments of the present apparatus and method. While the claims are not limited to such embodiments, an appreciation of various aspects of the apparatus and method is best gained through a discussion of various examples thereof.

The mode of carrying out the present apparatus and method is described by referring to the drawings.

Figure 2:
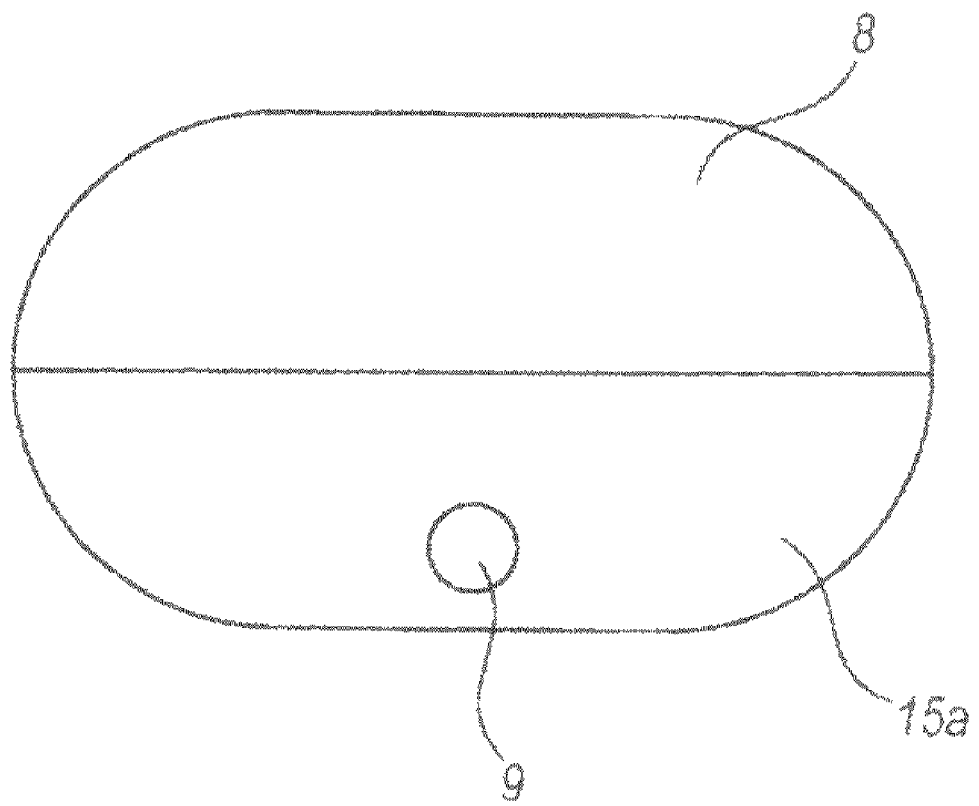
FIG. 2 is a cross-sectional view taken along line II-II line of FIG. 1.

FIG. 1 is a schematic view of an intake air device according to a first embodiment thereof. FIG. 2 is a cross-sectional view thereof taken along a line II-II of FIG. 1.

An intake air path 1 and an exhaust path 2 are connected to a combustion chamber 5 via respective openings. In the figure, a dotted line X shows an axis of the intake air path 1 when an intake airflow controller 15, described below, is not provided.

An intake air valve opens and closes the opening of the inlet air path 1 of the combustion chamber 5, and an exhaust valve opens and closes the opening of the exhaust path 2, both of which valves are driven by a camshaft not shown in the figure.

A piston 6 is slidably contained in a cylinder 12, and an igniter plug 7 spark-ignites mixed air and fuel introduced into the combustion chamber 5.

At the middle of the flow path of the intake air path 1, an intake air path bottom wall surface 13 gradually projects from upstream to downstream towards the axis line X, so that a portion having a narrow cross-section is provided in the flow path. The portion where the intake air path bottom wall surface 13 gradually comes close to the axis line X is called the intake airflow controller 15. Hereinafter, the cross-section of the intake air path at the downstream edge of the intake airflow controller 15—in other words, the portion where the cross-sectional area of the flow path is narrowest—is referred to as a deviation opening 8.

The cross-sectional view of the inlet air path 1 downstream of the deviation opening 8 is approximately the same as that upstream of the intake airflow controller 15, and in addition, the axis line X curves downwardly in the direction of the axis of the piston 6 as it comes closer to the combustion chamber 5.

An injection tube path 10 connecting the upstream side and the downstream side of the intake airflow controller 15 to each other is provided inside the intake airflow controller 15.

An opening 11, provided upstream of the injection tube path 10, opens to the intake air path bottom wall surface 13 near the upstream edge of the intake airflow controller 15, and an opening (hereinafter referred to as a supplementary opening) 9 opens to a location away from the intake air path bottom wall surface 13 of the downstream side surface 15a of the intake airflow controller 15. The axis line of the supplementary opening 9, as described above, intersects the axis line X of the curved intake air path 1 near the downstream edge of the intake air path 1.

In the intake air path 1, which is structured as above, part of the intake air passes along the intake airflow controller 15 so that the intake airflow is deviated in the side of the intake air path top wall surface 14 and flows into the combustion chamber 5 in the deviated state, whereby a turbulent airflow is generated in the combustion chamber 5.

The flow rate of the intake airflow that passes through the supplementary opening 9 is increased by the injection tube path 10 having a much smaller flow path area in a cross-sectional view than that of the intake path 1. In addition, the supplementary opening 9 is provided away from the intake air path bottom wall surface 13 so that the energy loss due to friction with the bottom wall surface 13 is small when the intake air from the supplementary opening 9 flows in the intake air path 1, and the energy loss due to interference with the intake airflow from the deviation opening 8 is also small. Therefore, the intake air that passes through the supplementary opening 9 becomes a highly directional jet flow and flows downstream of the supplementary opening 9 while, over a long period of time, maintaining its force at the time it passes through the supplementary opening 9.

Although the intake air that passes through the deviation opening 8 expands towards the intake air path bottom wall surface 13 as the intake air flows downstream, its expansion is prevented since the highly directional jet flow proceeds from the supplementary opening 9 at the bottom of the intake air path 1, and the deviation of the jet flow towards the intake air path top wall surface 14 is not significantly disturbed. When the highly directional jet flow from the supplementary opening 9 interflows with the main intake air around the downstream edge of the intake air path 1, an intake air component in the direction of the intake air path top wall surface 14—in other words, a component that deviates towards the intake air path top wall surface 14—is added to the main intake air.

Consequently, the intake air flows into the combustion chamber 5 in a state in which the intake air is highly deviated towards the intake air path top wall surface 14, thereby creating strong turbulent airflow.

In order to increase the effect of the interflow of intake air from the deviation opening 8 and the jet flow from the supplementary opening 9, it is desirable that the interflowing location be as close as possible to the downstream edge of the intake air path 1. When the flow path from the interflowing point to the downstream edge of the intake air path is long, the intake air expands and the deviation becomes weak when the intake air flows into the combustion chamber 5, even if the deviation is enhanced by the interflowing.

Therefore, the supplementary opening 9 is provided as far away as possible from the deviation opening 8, so that the jet flow from the supplementary opening 9 flows as far away as possible from the intake airflow of the deviation opening 8, thereby making the interflowing position with the intake airflow as close as possible to the downstream edge of the intake air path 1.

The above-mentioned effect is described with reference to FIGS. 3A and 3B.

Figure 3A:
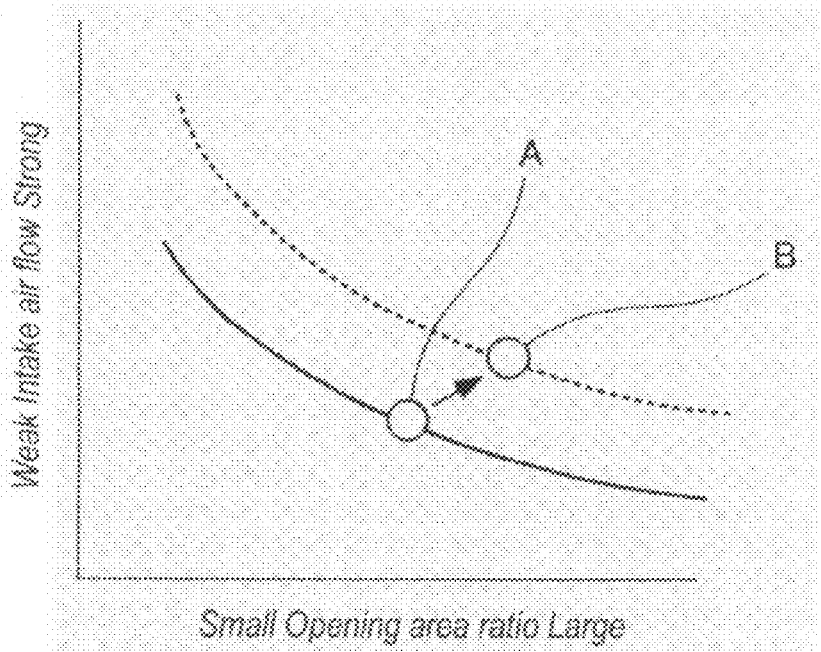
FIG. 3A is a graph showing the correlation between the intensity of an intake airflow and the opening area ratio.

FIG. 3A shows the correlation between the intensity of the intake airflow and the opening area ratio. This figure shows that the larger the opening area ratio, the weaker the intake airflow.

Figure 3B:
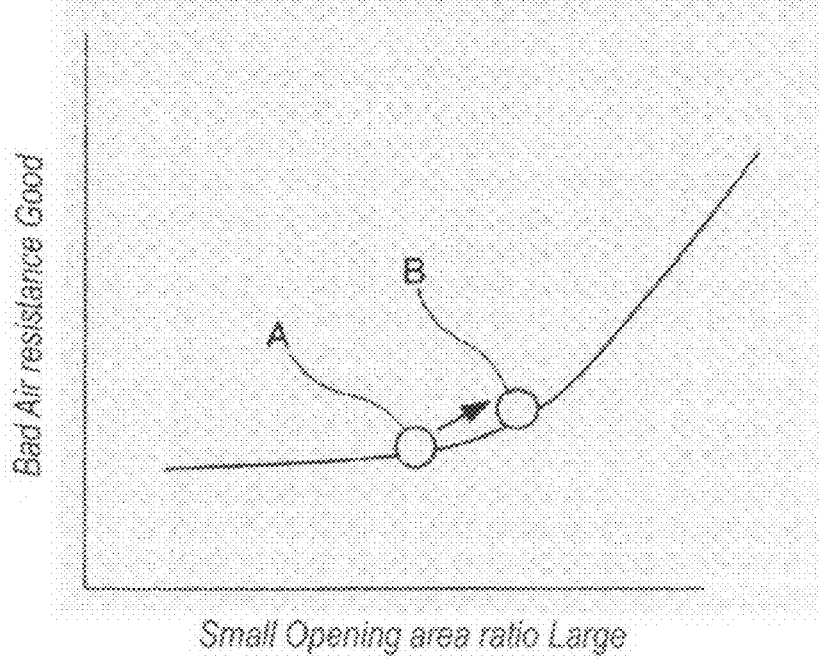
FIG. 3B is a graph showing the correlation between the air resistance and the opening area ratio.

FIG. 3B shows the correlation between the intake air resistance and the opening area ratio. This figure shows that by providing the supplementary opening 9, the air resistance is improved when the opening area ratio becomes greater.

The term opening area ratio in these figures means the ratio of the sum of the areas of deviation opening 8 and intake airflow controller downstream side surface 15a in the cross section of the intake air path 1 taken along the line II-II, and the total area of the deviation opening 8 and the supplementary opening 9. The solid line in FIG. 3A shows the condition in which the area of the supplementary opening 9 is zero—in other words, the condition in which no supplementary opening 9 is provided; and the dotted line shows the condition in which a supplementary opening 9 is provided.

A point A in FIGS. 3A and 3B shows a state in which the supplementary opening 9 is not provided at a certain opening area ratio, and a point B in these figures shows a state in which the supplementary opening 9 is provided under the same condition as that of point A.

As shown in FIG. 3A, when the supplementary opening 9 is provided under the point A condition, the opening area ratio is increased by the area of the supplementary opening 9, and the intake airflow is also intensified due to the effect of the jet flow from the above-mentioned supplementary opening 9.

In addition, as shown in FIG. 3B, when the opening area ratio is increased by the area of the supplementary opening 9, the air resistance is increased.

As described above, in the present embodiment, an intake airflow controller 15 is provided, thereby deviating the intake airflow that flows in the intake air path 1 to the side of the intake air path top wall surface 14, and a highly directional jet flow is run from the supplementary opening 9 that is provided at a location away from the intake air path bottom wall surface 13 of the downstream edge 15a of the intake airflow controller 15, thereby preventing the weakening of intake airflow that is deviated toward the intake air path top wall surface 14 due to disturbance.

In addition, with the curved intake air path 1, the intake airflow that is deviated towards the intake air path top wall surface 14 and the highly directional jet flow are interflowed at approximately the downstream edge of the intake air path 1—in other words, immediately before it flows into the combustion chamber 5—so that the deviation of the intake airflow towards the intake air path top wall surface 14 can be reinforced again immediately before flowing into the combustion chamber 5, and therefore stronger turbulence can be formed.

In addition, the supplementary opening 9 allows strong intake airflow even if the opening area ratio is large; therefore, the enhancement of the intake airflow and an increase in air resistance can both be achieved.

Figure 6:
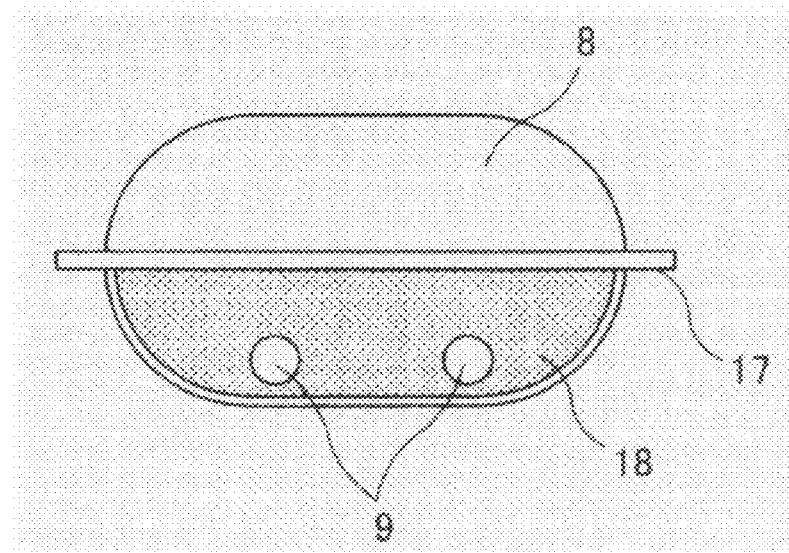
FIG. 6 is a cross-sectional view showing an example in which two supplementary openings are formed.

In the present embodiment, a single supplementary opening 9 is employed. However, two or more supplementary openings may be provided, as shown in FIG. 6, as long as they meet the conditions in which jet flows from the supplementary openings 9 at the location away from the wall surface of the intake air path 1 interflow with the intake airflow that passes through the deviation openings near the downstream edge of the intake air path 1, and therefore the intake airflow is deviated towards the intake air path top wall surface 14.

Figure 4:
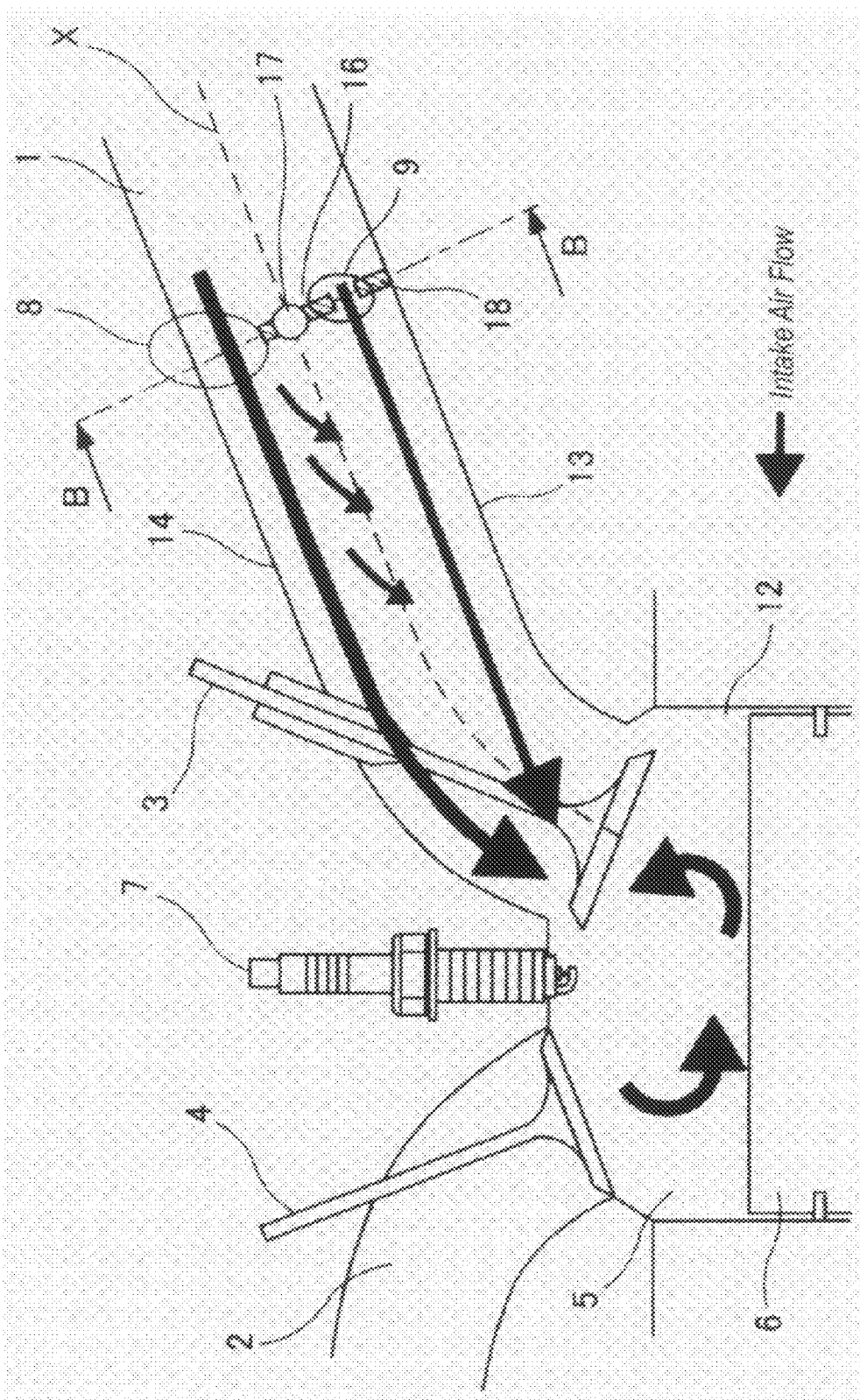
FIG. 4 is a schematic view of a system in which the present apparatus according to a second embodiment is incorporated.

FIG. 4 is a schematic view of the intake air device according to a second embodiment. The structures in FIG. 4 are the same as those of FIG. 1, except that an intake airflow control valve 16 is used instead of the intake airflow controller 15 of FIG. 1.

The intake air control valve 16 comprises a shaft 17 that extends horizontally to become approximately perpendicular to the axis line X, and a valve body 18 mounted on the shaft 17.

The shaft 17 is rotatably supported by, for example, side walls of the intake air path 1. The valve 18 is controlled to partially close the cross-section of the flow path of the intake air path 1 in its closed position, and to open part of the cross-section of the intake air path 1 by rotating shaft 17 so that the flow path area taken along line B-B, including the shaft 17, becomes a maximum.

In addition, a supplementary opening 9, similar to the supplementary opening 9 provided on the intake air controller 15 according to the first embodiment, is provided on the valve body 18 so that the intake air that passes through the supplementary opening 9 becomes a highly directional jet flow, as in the first embodiment, and interflows with the intake airflow from the deviation opening 8, immediately before flowing into the combustion chamber 5, at the back side of an umbrella of the intake air valve 3.

The intake air control valve 16 structured as above is controlled to be open or closed depending on the driving condition of the engine; for example, it is controlled to be open during low load driving and to be closed during high load driving.

Since turbulent airflow is formed in the combustion chamber 5 during low-load driving, combustion performance is improved, and the amount of intake air that flows into the combustion chamber 5 is increased during high load driving, thereby increasing the output performance.

The turbulent airflow formed during low load driving becomes strong, as in the first embodiment, due to the effect of the jet flow from the supplementary opening 9.

As described above, in addition to the same effect as in the first embodiment, in the present embodiment the intake airflow control valve 16 can be open or closed, and therefore, during a driving condition in which the amount of intake air is prioritized rather than forming a turbulent gas flow, the required amount of intake air can be supplied by opening the intake airflow control valve 16.

The first and second embodiments may be applied to an intake air double valve engine. In such a case, the intake airflow controller 15 or intake airflow control valve 16 can be provided for each of the intake air paths 1. The intake airflow controller 15 or intake airflow control valve 16 may be provided upstream of the branch of the intake air path 1, as shown in FIG. 5.

Figure 5:
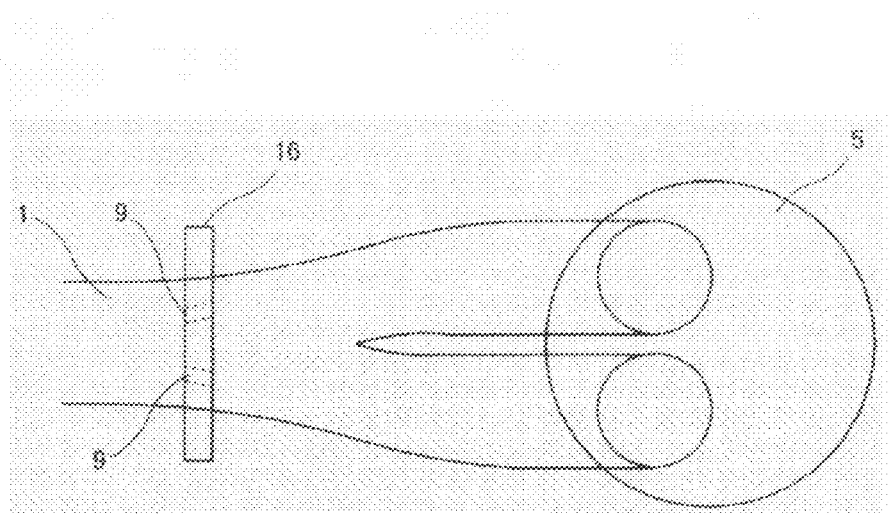
FIG. 5 is a schematic view of an example in which the present apparatus is applied to a double intake air valve system.

When the intake airflow controller 15 or intake airflow control valve 16 is provided upstream of the branch, as shown in FIGS. 5 and 6, at least two supplementary openings 9 are provided so that the jet flow from each of the supplementary openings 9 interflows with the intake airflow in the intake air path 1 after branching. FIG. 5 is a top view of the combustion chamber 5 and the intake air path 1.

Figure 7:
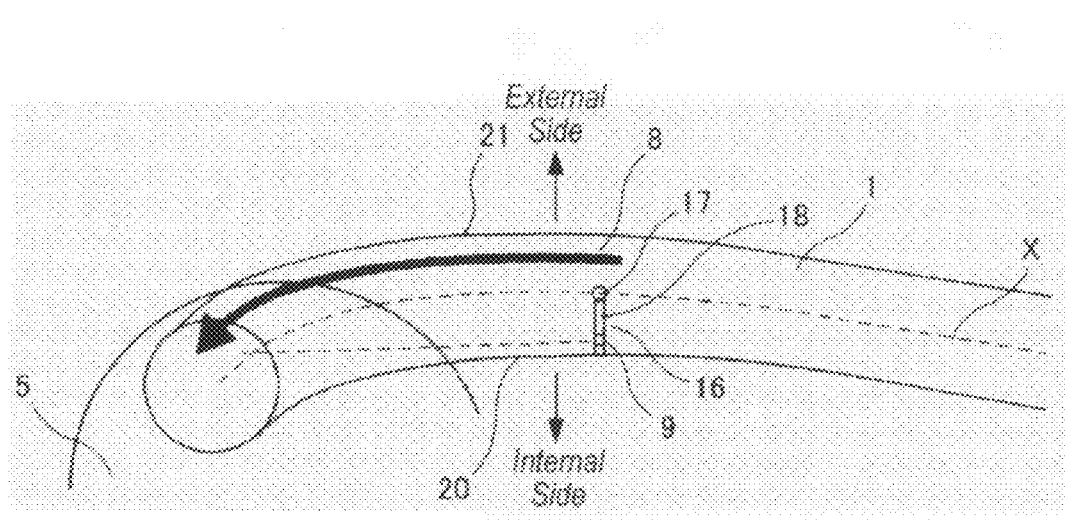
FIG. 7 is a schematic view of a system in which the present apparatus according to a third embodiment is incorporated.

FIG. 7 is a schematic view of the intake air device according to a third embodiment, as viewed from the top of the combustion chamber 5.

In the present embodiment, in order to generate a swirl in the combustion chamber 5, the intake air path 1 curves downstream of the flow path so that the downstream side becomes approximately parallel to the tangent line in the plan view of the combustion chamber 5. In FIG. 7, a wall of the inner circumference side of the curved intake air path 1 is called an inner wall surface 20 and a wall of an outer circumference side of the curved intake air path 1 is called an outer wall surface 21.

The intake airflow control valve 16, the deviation opening 8, and the supplementary opening 9 have the same structure as in the second embodiment and are provided upstream of the curved portion of the intake air path 1. The shaft 17 of the intake airflow control valve 16 is provided approximately parallel to the axis of the cylinder 12, and the valve body is provided to open and close the flow path in the side of the inner wall surface 20 by the shaft 17. The supplementary opening 9 is provided so that the intake airflow interflows with the intake airflow that passes through the deviation opening 8 at the bottom edge of the intake air path 1.

With the above-mentioned structure, when the intake air control valve 16 is closed, the intake airflow passing through the deviation opening 8 is deviated in the side of the outer wall surface 21, and the intake air that passes through the supplementary opening 9 becomes a highly directional jet flow and flows near the inner wall surface 20. Because the intake air path 9 is curved, the intake airflow from the deviation opening 8 and the jet flow from the supplementary opening 9 interflow immediately before they flow into the combustion chamber 5, and flow into the combustion chamber 5 in a state in which the deviation towards the outer wall surface 21 is large so that a stronger swirl can be formed in the combustion chamber 5.

The correlation between the opening area ratio, and the intake airflow and air resistance is the same as in the first and second embodiments, so that description thereof is omitted here.

As described above, in the present embodiment intake air flowing in the intake air path 1 is deviated in the side of the outer wall surface 21 by the intake air control valve 16, and a highly directional jet flow is run from the supplementary opening 9 that is provided away from the intake air path inner wall surface 20 when the intake airflow control valve 16 is closed, thereby preventing reduction of the deviation of the intake airflow that has been deviated in the side of the outer wall surface 21 due to disturbance, and in addition, the intake air path 1 is curved so that the intake airflow deviated in the side of the outer wall surface 21 and the highly directional jet flow are interflowed at the downstream edge of the intake air path 1—in other words, immediately before they flow into the combustion chamber 5—and therefore deviation of the intake airflow towards the outer wall surface 21 is intensified immediately before flowing into the combustion chamber 5. Thus a stronger swirl can be formed.

Strong intake airflow can be obtained from the supplementary opening 9, even with a large opening area ratio, and therefore the enhancement of the intake airflow and an increase in the air resistance can be both achieved.

Two or more supplemental openings 9 may be provided.

In addition, in the present embodiment, although the intake airflow control valve 16 is shown, an intake airflow controller 15 similar to that of the first embodiment can be used.

The appended claims are not limited to the above-mentioned embodiments. It goes without saying that a variety of modifications can be carried out within the extent of the technical philosophy defined within the scope of the patent claims.

The present apparatus and method can be applied to an intake air system of an internal combustion engine.

What is claimed is:

1. An intake device selectively connected to a combustion chamber of an internal combustion engine, comprising:
   a first pathway provided in a first side of the intake device;
   an airflow accelerator provided on a second side opposite to the first side of the intake device to deflect intake air toward the first pathway; and
   a second pathway being smaller in cross section than said first pathway provided to bypass the airflow accelerator and arranged such that a line obtained by extending a central axis of the second pathway intersects a flow of the intake air through the first pathway at a downstream portion of the intake device, the second pathway having a downstream opening provided on the second side of the intake device and spaced apart from an inside wall of the intake device.

2. The intake device as claimed in claim 1, wherein the airflow accelerator is a wall protruding internally of the intake device, and a downstream side of the protruding wall is constructed at a steep angle relative to an axis of the intake device.

3. The intake device as claimed in claim 1, wherein the airflow accelerator is provided by a rotatable valve comprising:
   a shaft extending laterally inside the intake device; and
   a valve body so constructed as to leave space in the first side, resulting in the first pathway in a valve closed position, and to obstruct the second side of the intake device in the valve closed position to form the airflow accelerator, the valve body having an opening that penetrates through the valve body so as to form the second pathway.

4. The intake device as claimed in claim 3, wherein the opening is formed in a vicinity of an outer edge of the valve body away from the shaft.

5. The intake device as claimed in claim 1, wherein the downstream portion of the intake device bends toward the second side of the intake device so that the line intersects the airflow axis at the downstream portion of the second pathway.

6. The intake device as claimed in claim 1, wherein the point at which the line intersects the airflow axis is proximate a downstream end of the intake device.

7. The intake device as claimed in claim 6, wherein the point is proximate an intake valve.

8. The intake device as claimed in claim 1, wherein an airflow passing through the intake device generates a tumble in the combustion chamber.

9. The intake device as claimed in claim 1, wherein an airflow passing through the intake device generates a swirl in the combustion chamber.

10. An internal combustion engine equipped with the intake device as claimed in claim 1.

11. A means for passing intake airflow in an intake passage for an internal combustion engine, comprising:
   means for passing a first airflow through a first pathway in a first side of the intake passage;
   means for restricting the intake airflow in a second side opposite to the first side of the intake passage; and
   means for emitting a second airflow, whose flow volume is smaller than that of the first airflow, through a second pathway from a position in the second side, with the second pathway being arranged such that a line obtained by extending a central axis of the second pathway intersects the first airflow through the first pathway at a downstream portion of the intake passage, and the position in the second side being spaced apart from an inside wall of the intake passage.

12. The means for passing intake airflow as claimed in claim 11, wherein
   the first airflow bends toward the second side in a downstream side of the first airflow so that the second airflow intersects the first airflow at a downstream portion of the intake passage.

13. The means for passing intake airflow as claimed in claim 11, wherein
   the point at which the second airflow intersects the first airflow is proximate a downstream end of the intake passage.

14. An intake air control apparatus comprising:
   an intake air path selectively connectable to a combustion chamber and having a wall; and
   an intake airflow control device having a first opening deviated in one direction when viewed from an axial direction of the intake air path by a partially closed cross-section of a flow path of the intake air path, the intake airflow control device selectively controlling distribution of intake airflow by deviating the intake airflow downstream of the first opening to a side in which the first opening is formed,
   the intake airflow control device having a second opening of smaller area than that of the first opening and deviated to a side opposite to the side in which the first opening is formed, and at a location away from the intake air path wall, such that a center line of the second opening intersects with an axis line of the intake airflow deviated by the first opening.

15. The intake air control apparatus according to claim 14, wherein
   the second opening is provided on an edge surface downstream of a portion closed by the intake air control device.

16. The intake air control apparatus according to claim 14, wherein
   the intake airflow control device is a valve having a shaft rotatably supported approximately perpendicular to an axis line of the intake air path, a valve body mounted on the shaft and having a through-hole wherein the first opening is formed and the through-hole becomes the second opening when the valve is closed.

17. The intake air control apparatus according to claim 16, wherein
   the through-hole is provided near an external edge of the valve that is farthest away from the shaft.

18. The intake air control apparatus according to claim 14, wherein
   the intake air path curves towards a second opening side, and downstream of the first opening, so that the center line of the second opening and the axis line of the intake airflow deviated by the first opening intersect with each other.

19. The intake air control apparatus according to claim 14, wherein
   an intersection of the center line of the second opening and the axis line of the intake airflow that is deviated by the first opening is located around the edge, and downstream of the intake airflow path.

20. The intake air control apparatus according to claim 14, wherein
   the intake airflow deviated by the first opening selectively generates turbulence in a combustion chamber.

21. The intake air control apparatus according to claim 14, wherein
   the intake airflow deviated by the first opening selectively generates a swirl in the combustion chamber.

* * * * *